United States Patent
Orita et al.

(10) Patent No.: US 7,985,494 B2
(45) Date of Patent: Jul. 26, 2011

(54) GLASS SUBSTRATE FOR MAGNETIC DISK AND MAGNETIC DISK APPARATUS

(75) Inventors: Nobuaki Orita, Tokyo (JP); Yasuhiro Naka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 150 days.

(21) Appl. No.: 12/275,576

(22) Filed: Nov. 21, 2008

(65) Prior Publication Data
US 2009/0142626 A1 Jun. 4, 2009

(30) Foreign Application Priority Data
Nov. 29, 2007 (JP) .................. 2007-309395

(51) Int. Cl.
G11B 5/84 (2006.01)
G11B 5/706 (2006.01)

(52) U.S. Cl. ............... 428/848.1; 428/846.9; 428/848.2; 360/135

(58) Field of Classification Search .............. 428/810, 428/848, 848.1, 832, 691, 812, 846.9, 848.2, 428/842, 64.1, 64.2, 812.3, 848.6; 360/75, 360/135; 65/30.14
See application file for complete search history.

(56) References Cited

U.S. PATENT DOCUMENTS

| | | | |
|---|---|---|---|
| 2003/0067706 A1* | 4/2003 | Gillis et al. ............... 360/75 |
| 2003/0172677 A1* | 9/2003 | Miyamoto et al. ......... 65/30.14 |
| 2005/0074635 A1* | 4/2005 | Mitani et al. ............. 428/848 |
| 2007/0003796 A1* | 1/2007 | Isono et al. ............... 428/832 |
| 2007/0003799 A1* | 1/2007 | Ogiwara et al. .......... 428/848.1 |
| 2007/0202312 A1* | 8/2007 | Kim et al. ................ 428/848.6 |
| 2007/0224821 A1* | 9/2007 | Koyata et al. .............. 438/691 |
| 2007/0243421 A1* | 10/2007 | Machida et al. .......... 428/846.9 |
| 2007/0247739 A1* | 10/2007 | Iida ............................ 360/75 |
| 2007/0251270 A1* | 11/2007 | Miyatani et al. ............ 65/31 |
| 2007/0271957 A1 | 11/2007 | Nakamura et al. |
| 2008/0020238 A1* | 1/2008 | Tanaka et al. ............ 428/810 |
| 2008/0166597 A1* | 7/2008 | Osawa ..................... 428/812 |
| 2008/0216515 A1 | 9/2008 | Kumada et al. |
| 2009/0100874 A1 | 4/2009 | Tateishi et al. |
| 2009/0122448 A1 | 5/2009 | Kuraseko et al. |

FOREIGN PATENT DOCUMENTS

| | | |
|---|---|---|
| JP | 2005-317181 | 11/2005 |
| JP | 2007-12157 | 1/2007 |
| JP | 2007-126302 | 5/2007 |

* cited by examiner

Primary Examiner — Kevin M. Bernatz
Assistant Examiner — Louis Falasco
(74) Attorney, Agent, or Firm — Oblon, Spivak, McClelland, Maier & Neustadt, L.L.P.

(57) ABSTRACT

A glass substrate for a magnetic disk satisfies $Ra1 \leq 0.8$ [nm], $0$ [nm] $\leq Ra1 - Ra2 \leq 0.2$ [nm], $Wa1 \leq 0.6$ [nm], and $0$ [nm] $\leq Wa2 - Wa1 \leq 0.2$ [nm]. Ra1 is an average surface roughness of a first annular area between 1 mm and 3 mm outward from an inner periphery of a main surface of the glass substrate, Ra2 is an average surface roughness of a second annular area between 1 mm and 3 mm inward from an outer periphery of the main surface, Wa1 is an average waviness of the first area in a circumferential direction of the glass substrate having a cycle of 300 μm to 5 mm, and Wa2 is an average waviness of the second area in the circumferential direction having a cycle of 300 μm to 5 mm.

4 Claims, 5 Drawing Sheets

| SAMPLE No. | Ra1 [INNER CIRCUMFERENCE] [nm] | Ra2 [OUTER CIRCUMFERENCE] [nm] | σ [Ra] | Ra1-Ra2 [nm] |
|---|---|---|---|---|
| No.1 | 0.40 | 0.43 | 0.01 | -0.03 |
| No.2 | 0.50 | 0.40 | 0.03 | 0.10 |
| No.3 | 0.51 | 0.40 | 0.04 | 0.11 |
| No.4 | 0.55 | 0.41 | 0.05 | 0.14 |
| No.5 | 0.55 | 0.41 | 0.05 | 0.14 |
| No.6 | 0.82 | 0.60 | 0.08 | 0.20 |
| No.7 | 0.65 | 0.50 | 0.04 | 0.15 |
| No.8 | 0.75 | 0.60 | 0.05 | 0.15 |
| No.9 | 0.60 | 0.45 | 0.04 | 0.15 |

FIG.8

| SAMPLE No. | Wa1 [INNER CIRCUMFERENCE] [nm] | Wa2 [OUTER CIRCUMFERENCE] [nm] | σ [Wa] | Wa2-Wa1 [nm] |
|---|---|---|---|---|
| No.1 | 0.58 | 0.62 | 0.01 | 0.04 |
| No.2 | 0.50 | 0.60 | 0.03 | 0.10 |
| No.3 | 0.62 | 0.50 | 0.04 | -0.12 |
| No.4 | 0.65 | 0.70 | 0.03 | 0.05 |
| No.5 | 0.55 | 0.65 | 0.03 | 0.10 |
| No.6 | 0.52 | 0.62 | 0.03 | 0.10 |
| No.7 | 0.50 | 0.65 | 0.04 | 0.15 |
| No.8 | 0.55 | 0.60 | 0.04 | 0.05 |
| No.9 | 0.50 | 0.75 | 0.05 | 0.25 |

FIG.9

| SAMPLE No. | TD [INNER CIRCUMFERENCE] | TD [OUTER CIRCUMFERENCE] | TO [INNER CIRCUMFERENCE] | TO [OUTER CIRCUMFERENCE] |
|---|---|---|---|---|
| No.1 | 0.6 | 0.6 | 0.8 | 0.6 |
| No.2 | 0.6 | 0.6 | 0.65 | 0.6 |
| No.3 | 0.7 | 0.6 | 0.7 | 0.6 |
| No.4 | 0.7 | 0.6 | 0.7 | 0.6 |
| No.5 | 0.6 | 0.6 | 0.65 | 0.6 |
| No.6 | 0.7 | 0.6 | 0.7 | 0.6 |
| No.7 | 0.6 | 0.6 | 0.65 | 0.6 |
| No.8 | 0.6 | 0.6 | 0.65 | 0.6 |
| No.9 | 0.6 | 0.7 | 0.65 | 0.7 |

[UNIT: atm]

GLASS SUBSTRATE FOR MAGNETIC DISK AND MAGNETIC DISK APPARATUS

BACKGROUND OF THE INVENTION

1. Field of the Invention

The present invention relates to a glass substrate for a magnetic disk and a magnetic disk apparatus.

2. Description of the Related Art

Nowadays, drastic technical innovations are needed in information recording technologies, especially in magnetic recording technologies as information technologies (IT) evolve. To catch up the trend, fast-paced increase in information recording density continues for a magnetic disk that is mounted on a hard disk drive (HDD) functioning as a magnetic disk apparatus that serves as a computer storage.

Recently, there is an increasing demand for mounting an HDD in a portable device. To satisfy such a demand, a glass substrate with high strength, high rigidity, and high impact-resistance is employed as a substrate for a magnetic disk. A glass substrate can easily provide a smooth surface, so that a fly height of a magnetic head that performs recording and reproducing while flying over a magnetic disk can be reduced. Therefore, a magnetic desk with higher information recording density is attainable by the use of the glass substrate as a magnetic disk substrate. Namely, the glass substrate is advantageous in that it reduces the fly height of the magnetic head.

To increase the information recording capacity in the magnetic disk, an information signal-unrecorded area of the magnetic disk needs to be reduced. In achieving this, introduction of a load/unload method (an LUL method) otherwise known as "a ramp load method" that enables increasing the information recording capacity has been promoted in place of a conventional contact start stop method (a CSS method) as a start/stop method for an HDD.

The conventional CSS method disadvantageously needs to have a CSS zone in a magnetic disk, on which a magnetic head is placed when the magnetic disk is not in use (in a stop state).

By contrast, in the LUL method, the magnetic head moves toward an outer periphery of the magnetic disk and then it stops at a position that is out of a space over the magnetic disk when the magnetic disk is not in use, thus enabling to prevent contact of the magnetic head with the magnetic disk unlike the CSS method. This can eliminate the need to provide antistick concavities and convexities on the surface of the magnetic disk that have been generally provided in the CSS zone. By the LUL method, a highly smooth main surface of the magnetic disk is attainable.

Thus, further reduction of the fly height of the magnetic head can be realized by the LUL magnetic disk compared with the CSS magnetic disk, so that a signal noise ratio (an S/N ratio) of recording signals can be improved and higher recording density is attainable.

The introduction of the LUL method has enabled a narrower fly height for the magnetic head; however, this created another requirement. That is, a stable operation of the magnetic head is required at a nanosized fly height of equal to or less than 10 nanometers. In such a minute space, fly stiction phenomenon frequently occurs when the magnetic head flies over the magnetic disk.

The fly stiction phenomenon is an unstable fly height or flying state of a magnetic head that is flying over a magnetic disk, thus, generating irregular reproduction output fluctuation. This fly stiction phenomenon may cause head crash, that is, bumping the magnetic disk by the flying magnetic head occurs.

Efforts have been made for the conventional HDDs to prevent such fly stiction phenomenon by applying a higher rotation velocity to the magnetic disk, thus applying a higher relative linear velocity between the magnetic disk and the magnetic head, and by stabilizing the fly height or flying state by the structure of the magnetic head.

However, recently, demand has been increasing for a smaller HDD mountable on devices such as a cell phone, a digital camera, a portable information device, and a car navigation system that have a much smaller device size than a personal computer (PC) and need a high response speed. For example, the small-sized HDD that accommodates a magnetic disk manufactured using a substrate with an outer diameter of equal to or less than 50 millimeters and a thickness of equal to or less than 0.5 millimeter is needed.

A small magnetic disk of which outer diameter is equal to or less than 50 millimeters is typically used for a small HDD. In the small magnetic disk, an outer circumference and an inner circumference are small, so that the relative linear velocity between the magnetic disk and the magnetic head is low. In addition, a small spindle motor is generally used to rotate the small magnetic disk. Because the spindle motor is small, further speeding-up of the rotation of the magnetic disk is not easy, which may influence the stability of the fly height and flying state of the magnetic head, or may not sufficiently prevent occurrence of the fly stiction.

A small magnetic head is used in the small magnetic disk. The stability of the fly height or flying state of the magnetic head is low.

In addressing prevention of the fly stiction phenomenon, for example, Japanese Patent Application Laid-open No. 2005-317181 discloses to increase the surface roughness in a radial direction of a main surface of a circular substrate by forming an anisotropic texture on the main surface in the generally circumferential direction. On the other hand, Japanese Patent Application Laid-open No. 2007-12157 teaches to use a disk substrate having a diameter of equal to or less than 1 inch and having a relation represented by 0 nanometer<$Ra1-Ra2 \leq 0.2$ nanometer, where $Ra1$ is an average surface roughness of an inner circumferential surface of data area and $Ra2$ is an average surface roughness of an outer circumferential surface of the data area.

As stated above, the technologies in Japanese Patent Application Laid-open No. 2005-317181 and Japanese Patent Application Laid-open No. 2007-12157 have addressed the stable floating characteristics of the magnetic head by increasing the average surface roughness of a glass substrate for a magnetic disk in a circumferential direction from an outer circumferential side to an inner circumferential side of a main surface of the glass substrate. The arithmetic average roughness means the arithmetically averaged roughness of the surface of the glass substrate for the magnetic disk measured by causing a measuring probe to scan the glass substrate in the circumferential direction when a 5-micrometer×5-micrometer area of the glass substrate is measured by an atomic force microscope.

However, there has been a problem that fly stiction phenomenon in a further downsized magnetic disk could not be surely prevented only by the conventional controlling of the average surface roughness in the circumferential direction of the substrate.

In particular, in a recent magnetic disk with a fly height of less than 10 nanometers, air molecule is in the order of a mean free path (64 nanometers) of a typical air molecule. Thus, the generation of a floating pressure can not be explained by the flow of an airflow continuum. The influence of collision of air molecules with a solid wall is larger than that of a viscosity resistance generated due to collision between air molecules and air molecules.

SUMMARY OF THE INVENTION

It is an object of the present invention to at least partially solve the problems in the conventional technology.

According to an aspect of the present invention, there is provided a glass substrate for a magnetic disk that is mounted on a hard disk drive. The glass substrate satisfies $Ra1 \leq 0.8$ nanometer, 0 nanometer $< Ra1-Ra2 \leq 0.2$ nanometer, $Wa1 \leq 0.6$ nanometer, and 0 nanometer $< Wa2-Wa1 \leq 0.2$ nanometer, where Ra1 is an average surface roughness of a first annular area between 1 millimeter and 3 millimeters outward from an inner periphery of a main surface of the glass substrate, Ra2 is an average surface roughness of a second annular area between 1 millimeter and 3 millimeters inward from an outer periphery of the main surface, Wa1 is an average waviness of the first area in a circumferential direction of the glass substrate having a cycle of 300 micrometers to 5 millimeters, and Wa2 is an average waviness of the second area in the circumferential direction having a cycle of 300 micrometers to 5 millimeters.

According to another aspect of the present invention, there is provided a magnetic disk apparatus that operates based on a load/unload method and includes a magnetic disk made of a glass substrate. The magnetic disk satisfies $Ra1 \leq 0.8$ nanometer, 0 nanometer $< Ra1-Ra2 \leq 0.2$ nanometer, $Wa1 \leq 0.6$ nanometer, and 0 nanometer $< Wa2-Wa1 \leq 0.2$ nanometer, where Ra1 is an average surface roughness of a first annular area between 1 millimeter and 3 millimeters outward from an inner periphery of a main surface of the glass substrate, Ra2 is an average surface roughness of a second annular area between 1 millimeter and 3 millimeters inward from an outer periphery of the main surface, Wa1 is an average waviness of the first area in a circumferential direction of the glass substrate having a cycle of 300 micrometers to 5 millimeters, and Wa2 is an average waviness of the second area in the circumferential direction having a cycle of 300 micrometers to 5 millimeters.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Based on the above idea that a fly height is largely influenced by collision of air molecules with a solid wall, a research made by the inventors of the present patent application showed that air molecules travel beyond the order of a floating space of a magnetic disk and interaction of the air molecules with a solid wall of a substrate is influenced by the shape characteristics in wider ranges than conventionally perceived. In other words, controlling the average surface roughness at a 5-micrometer×5-micrometer area of a substrate stated in Japanese Patent Application Laid-open No. 2007-12157 is not enough for surely preventing occurrence of fly stiction. Another finding is that the surface shape characteristics of a substrate in wider ranges including fluctuation in a circumferential direction of the substrate are important.

Figure 1:
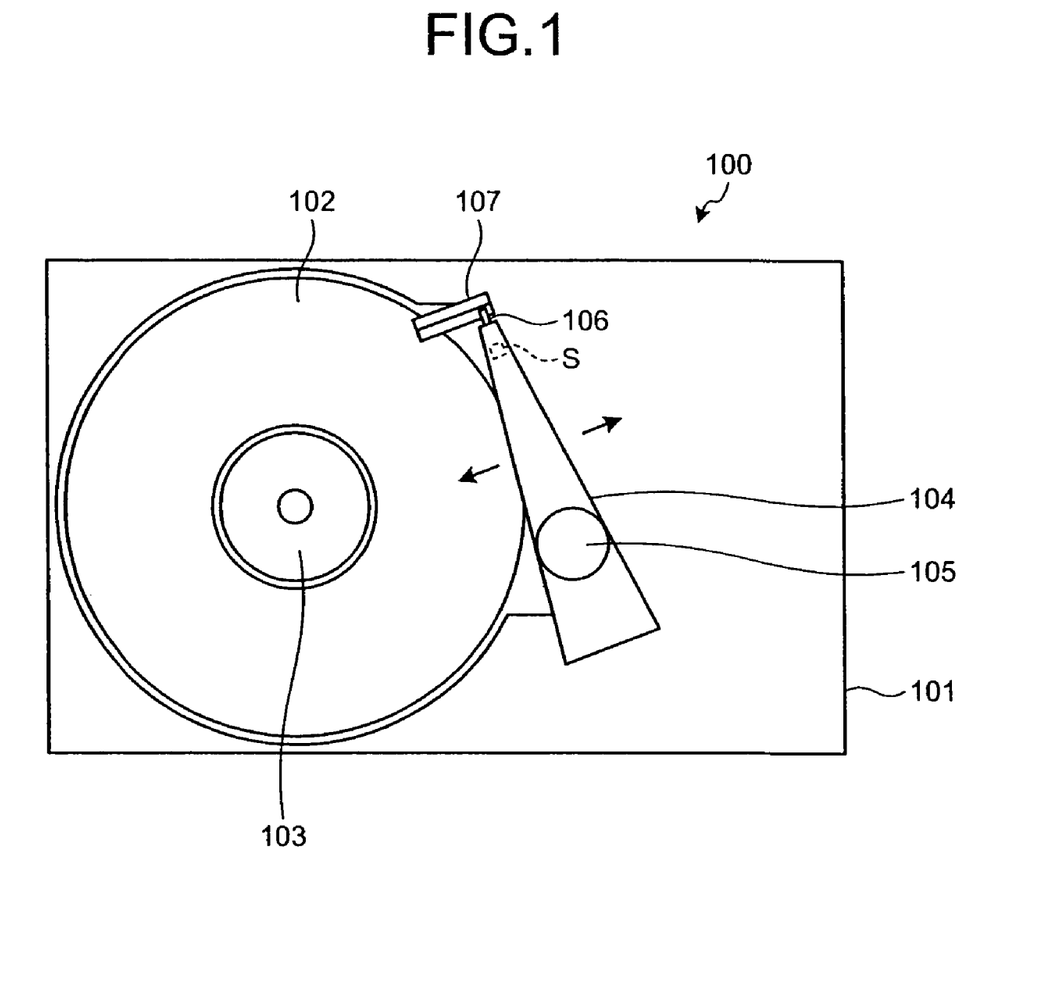
FIG. 1 is a plan view of a magnetic disk apparatus according to an embodiment of the present invention.

FIG. 1 is a plan view of a magnetic disk apparatus 100 according to an embodiment of the present invention. The magnetic disk apparatus 100 employs an LUL method and includes a magnetic disk 102, an arm 104, and a ramp 107 on a base 101.

The magnetic disk 102 is mounted on a spindle motor (not shown) that is positioned under the magnetic disk 102 through a clamp 103, and rotates and stops by the action of the spindle motor. The arm 104 is a rotary actuator and rotates around a rotary shaft 105. A slider S having a magnetic head is mounted near the tip of the arm 104. A lift tab 106 is provided at the tip of the arm 104. The ramp 107 is provided above and near an outer periphery of the magnetic disk 102.

When the magnetic disk 102 is in a stand still state (i.e., not rotating), the arm 104 is positioned such that the slider S stays away from a main surface (front surface) of the magnetic disk 102 and the lift tab 106 rides on the ramp 107. When the magnetic disk 102 starts to rotate, the arm 104 rotates around the rotary shaft 105 counterclockwise, the lift tab 106 slidingly moves on the ramp 107, and the slider S is loaded on the main surface of the magnetic disk 102 to be opposed thereto.

In the magnetic disk 102, a recording zone made of a magnetic material is formed in a main surface of a glass substrate 1. The glass substrate 1 for producing the magnetic disk 102 is explained below.

Figure 2:
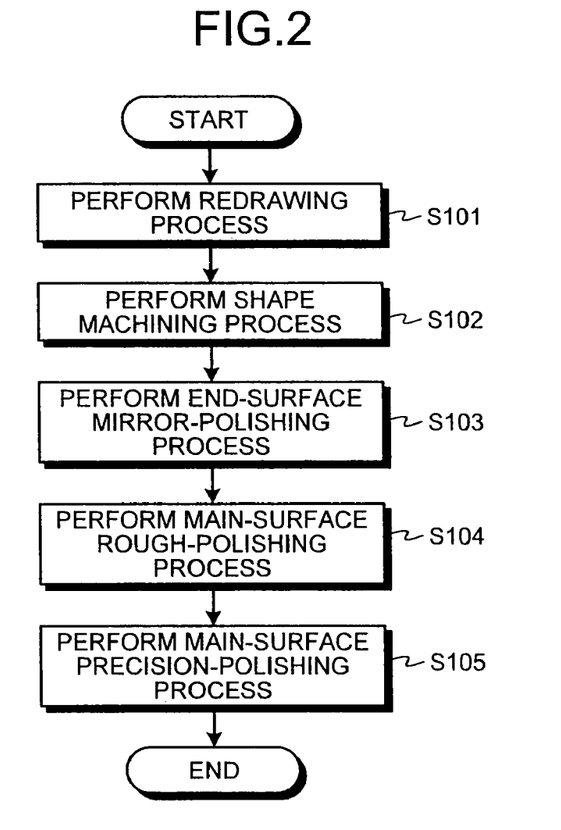
FIG. 2 is a flowchart of a method of manufacturing a glass substrate for a magnetic disk according to the embodiment.

FIG. 2 is a flowchart of a method for manufacturing the glass substrate 1. The glass substrate 1 is manufactured through sequential steps of a redrawing process (Step S101), a shape machining process (Step S102), an end-surface mirror-polishing process (Step S103), a main-surface rough-polishing process (Step S104), and a main-surface precision-polishing process (Step S105).

In the redrawing process, a 0.6-millimeter-thick sheet glass is redrawn from a sheet glass preform made of amorphous aluminosilicate glass. The surface roughness Ra of the sheet glass is about 0.8 nanometer. The redrawing process is performed by the redrawing method disclosed in, for example, Japanese Patent Application Laid-open No. 2007-126302. The redrawing method disclosed in Japanese Patent Application Laid-open No. 2007-126302 is preferable because a glass plate having small surface roughness is easily produced with this redrawing method. However, other known methods such as a float method, a fusion method, or a down-draw method can also be employed using a molten glass as a material.

Figure 3:
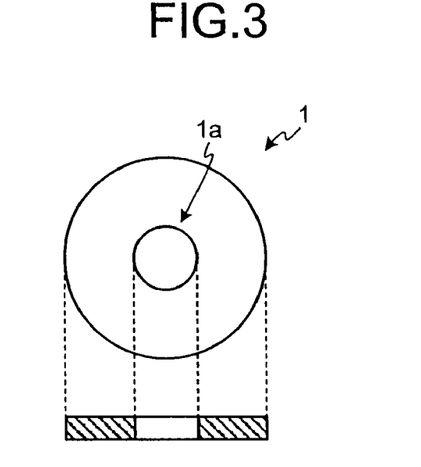
FIG. 3 is a schematic diagram illustrating a plan view and a cross sectional view of the glass substrate.

In the shape machining process, a 0.6-millimeter-thick disk-shaped glass substrate having a diameter of 28.7 millimeters is formed from the sheet glass redrawn in the redrawing process. Thereafter, a circular hole 1a of diameter 6.1 millimeter is formed in the center of the glass substrate using a cylindrical polishing stone, the outer peripheral end surface of the glass substrate is polished so that the glass substrate has a diameter of 27.43 millimeters, and then the outer peripheral end surface and an inner peripheral end surface are chamfered. As a result, the glass substrate 1 having the circular hole 1a as shown in FIG. 3 is produced. The maximum surface roughness Rmax of the end surface of the glass substrate 1 is about 4 micrometers. Generally, a 65-millimeter-outer-diameter magnetic disk is incorporated in a 2.5-inch HDD.

In the end-surface mirror-polishing process, the glass substrate 1 is rotated and the end surfaces (the outer and inner peripheral end surfaces) of the glass substrate 1 are polished by a conventional brush polishing method such that the maximum surface roughness Rmax is made to be about 1 micrometer and the average surface roughness Ra is made to be about 0.3 micrometer. The polished main surface of the glass substrate 1 is cleaned with water. A plurality of the glass substrates 1 are stacked and end surfaces of those glass substrates 1 are polished in batch in the end-surface mirror-polishing process. It is preferable that the polishing of the end surfaces be performed before the main-surface polishing process to avoid an awkward situation where scratches and the like remain on the main surface of the glass substrate 1. By this end-surface mirror-polishing process, the end surfaces of the glass substrate 1 are polished mirror-like, so that generation of particles and the like is preventable. The diameter of the polished glass substrate 1 is 27.4 millimeters.

Figure 4:
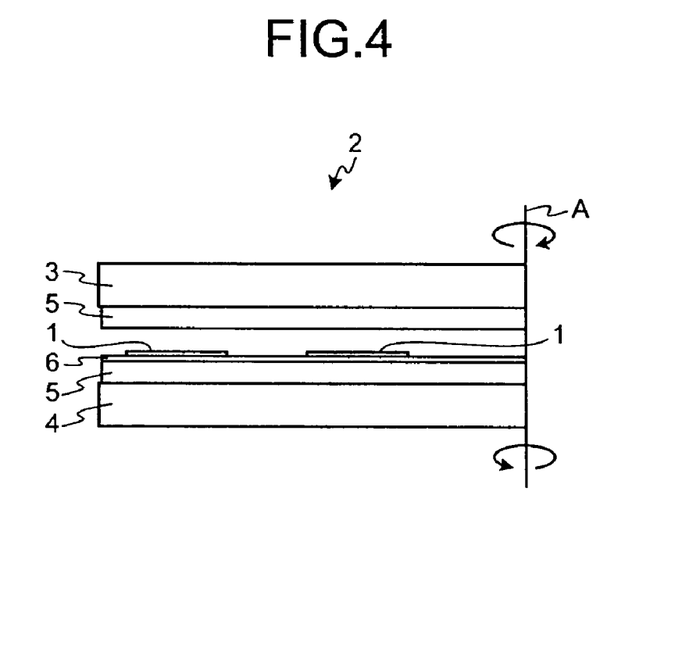
FIG. 4 is a side view illustrating part of a polishing machine that simultaneously polishes front and rear surfaces of the glass substrate.

In the main-surface rough-polishing process, the main surface is roughly polished using a polishing machine 2 including a planetary gear mechanism that simultaneously rough-polishes the main surface and a rear surface. FIG. 4 is a side view illustrating part of the polishing machine 2. The polishing machine 2 includes an upper table 3 and a lower table 4 both made of cast iron, carriers 6 arranged between the upper table 3 and the lower table 4 to retain the glass substrates 1, and polishing stones 5 made of cerium oxide, each of which is arranged on the upper table 3 and the lower table 4 to be in contact with the glass substrates 1. Namely, the polishing machine 2 retains the glass substrates 1 with the carriers 6 between the upper table 3 and the lower table 4, presses the glass substrates 1 by the upper table 3 and the lower table 4 at a predetermined processing force, and rotates the upper table 3 and the lower table 4 around an axis A in opposite directions while supplying polishing solution such as pure water at a predetermined supply amount between the polishing stones 5 and the glass substrate 1. Thus, each of the glass substrates 1 slides on the surfaces of the polishing stones 5, so that the both surfaces of the glass substrate 1 are simultaneously polished.

The cerium oxide polishing stone is made of resin in which cerium oxide powders are dispersed. For example, phenol resin, epoxy resin, melamine resin, polyester resin, or urethane resin that is used for a general polishing stone, or a mixture of two or more of these resins can be used as the resin for the cerium oxide polishing stone.

Figure 5:
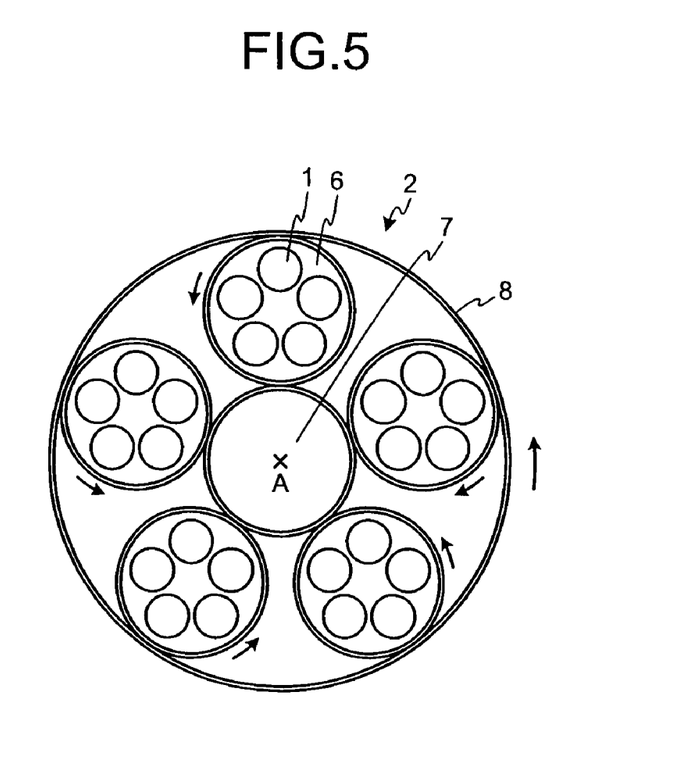
FIG. 5 is a plan view of the polishing machine without an upper table.

FIG. 5 is a plan view of the polishing machine 2 without the upper table 3. Each of the carriers 6 retains five glass substrates 1 at maximum. A gear formed on an outer periphery of each of the carriers 6 engages with a gear formed on an outer periphery of a sun gear 7 and with an internal gear 8. With this configuration, each of the carriers 6 rotates on its axis and moves along the periphery of the sun gear 7, so that the both surfaces of each of the glass substrates 1 retained by the carriers 6 are uniformly polished.

In the main-surface precision-polishing process, the glass substrates 1, which are made to be donut-shaped by the polishing machine 2 in the previous process, are set for precision-polishing the main surfaces of the glass substrates 1 until the glass substrates 1 get a desirable thickness of 0.381 millimeter using a hard-polyurethane polishing pad while supplying slurry including colloidal silica. The main surface and end surface of the glass substrate 1 that has been cleaned is visually checked. After the visual check, a precise checking utilizing the light reflection, scattering, and transmission is performed. It is confirmed that there are no defects such as protrusion created by such as particle adhesions or scratches on the main surfaces and the end surfaces of the glass substrates 1.

After completion of the main-surface precision-polishing process, surface roughness of each of the main surfaces of the glass substrates 1 is measured by an atomic force microscope (AFM, manufacturer: Shimadzu Corporation, model: SPM-9500J3). It is then confirmed that the maximum surface roughness Rmax is 2.5 nanometers and the average surface roughness Ra is 0.3 nanometer, which means the surface is made to be super smooth. The values of the surface roughness for the surface profile measured by the AFM are calculated in accordance with Japanese Industrial Standards (JIS) B0601.

Each of the glass substrates 1 is checked to confirm whether the inner diameter is 7 millimeters, the outer diameter is 27.4 millimeters, and the thickness is 0.381 millimeter, which are within the predetermined dimension range for a glass substrate used for a 1.0-inch magnetic disk.

Subsequently, the surface roughness of an inner peripheral end surface of the circular hole 1a of the glass substrate 1 was measured. The measurement values were 0.4 micrometer for the maximum surface roughness Rmax at the chamfered portion, 0.04 micrometer for the average surface roughness Ra at the chamfered portion, 0.4 micrometer for the maximum surface roughness Rmax at the side wall surface, and 0.05 micrometer for the average surface roughness Ra at the side wall surface. Similarly, the surface roughness of an outer peripheral end surface of the glass substrate 1 was measured. The measurement values were 0.04 micrometer for the average surface roughness Ra at the chamfered portion, and 0.07 micrometer for the average surface roughness Ra at the side wall surface. As the measurement values show, the inner peripheral end surface is finished to be a mirror-like surface similarly to the outer peripheral end surface.

It was also confirmed that each of the surfaces of the glass substrates 1 had foreign objects or particles that may cause thermal asperity thereon, and the inner peripheral end surface of the circular hole 1a had no foreign objects or cracks thereon.

For the material of the glass substrate 1, a glass ceramic such as an amorphous glass or a crystallized glass can be employed. Especially, the amorphous glass is preferable from the viewpoint of molding characteristics or machining characteristics. Other than the amorphous aluminosilicate glass, the preferable glasses are, for example, a soda-lime glass, a soda aluminosilicate glass, an aluminoborosilicate glass, a borosilicate glass, an air-cooled or liquid-cooled thermally toughened glass, and a chemically toughened glass.

Nine samples No. 1 to No. 9 of the glass substrates 1 having a surface roughness distribution of equal to or less than 0.1 nanometer, an outer diameter of 27.4 millimeters, an inner diameter of 7 millimeters, and a thickness of 0.381 millimeter were produced for comparison with the above manufacturing method. Then, nine magnetic disks corresponding to the sample No. 1 to No. 9 were produced with a sputter method under the condition of 0.27 pascal under argon (Ar) atmosphere such that layers are sequentially formed over each of the glass substrates 1 in the order of a chromium titanium (CrTi) seed layer, a chromium (Cr) alloy underlayer, a cobalt chromium platinum boron (CoCrPtB) alloy magnetic layer, and a carbon protective coat. Each of the magnetic disks was checked for its floating characteristics.

Each of the glass substrates 1 is manufactured such that the magnitude of the waviness in the circumferential direction of the main surface differs between the inner circumference and the outer circumference by changing the pressure, the number of rotations, and the roughness of the polishing stone 2 when rough-polishing the glass substrate 1. The different waviness magnitudes between the inner circumferential direction and the outer circumferential direction of the main surface of the glass substrate 1 are realized by changing the roughness of the polishing stone 2 in a radial direction. The different surface roughnesses between the inner circumference and the outer circumference are realized by changing the condition of the slurry supply including colloidal silica when fine-polishing each of the glass substrates 1. For example, this can be achieved by supplying slurry from the outer circumferential side of the glass substrate 1.

Figure 6:
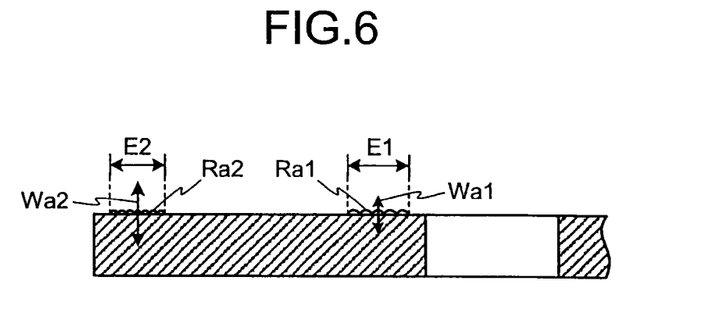
FIG. 6 is a schematic diagram representing measurement positions of a surface roughness and a waviness of the glass substrate.
Figure 7:
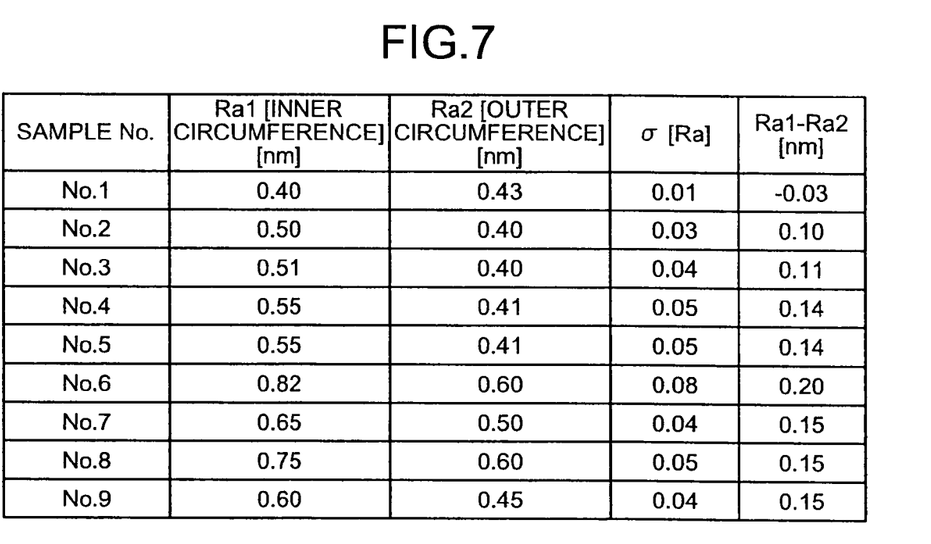
FIG. 7 is a table depicting results of surface roughness measurement of samples.
Figure 8:
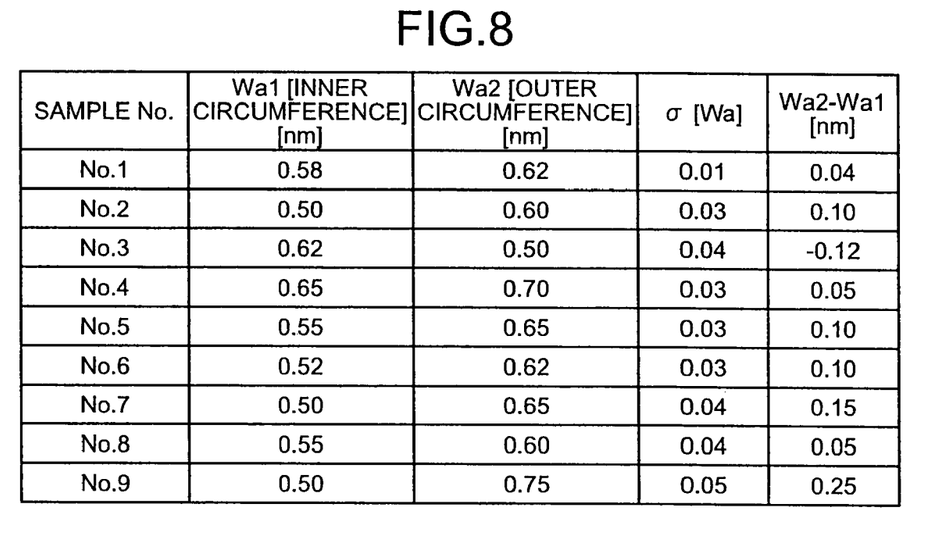
FIG. 8 is a table depicting results of waviness measurement of the samples.

The measurement results of the average surface roughness Ra and the average waviness Wa having a cycle of 300 micrometers to 5 millimeters in the circumferential direction of each of the glass substrates 1 are as shown in FIGS. 7 and 8. As shown in FIG. 6, the average surface roughness Ra1 of the inner circumference of the glass substrate 1 is the average of the roughness in an annular area E1 between 1 millimeter and 3 millimeters outward from the inner periphery of the main surface of the glass substrate 1, and the average surface roughness Ra2 of the outer circumference is the average of the roughness in an annular area E2 between 1 millimeter and 3 millimeters inward from the outer periphery of the glass substrate 1. The average waviness Wa1 in the inner circumferential direction is the average of the waviness in the annular area E1 having a cycle of 300 micrometers to 5 millimeters in the circumferential direction, and the average waviness Wa2 in the outer circumferential direction is the average of the waviness in the annular area E2 having a cycle of 300 micrometers to 5 millimeters in the circumferential direction.

The values of the average surface roughness Ra1 and Ra2 in the circumferential direction of each of the samples No. 1 to No. 9 of the glass substrates 1 and the deviation σ (Ra) thereof are measured by utilizing the AFM SPM-9500 J3 manufactured by Shimadzu. The values of the average waviness Wa1 and Wa2 in the circumferential direction and the deviation σ (Wa) thereof are measured by utilizing an interferometer (OPTIFLAT) for a digital versatile disc (DVD) produced by Phase Shift Technology Inc. The OPTIFLAT scans a predetermined area of a substrate surface using a 680-nanometer-wavelength white light and calculates the waviness by the interference pattern generated at a light combined point at which a reflecting light from the substrate surface and a reflecting light from the reference surface are combined.

Figure 9:
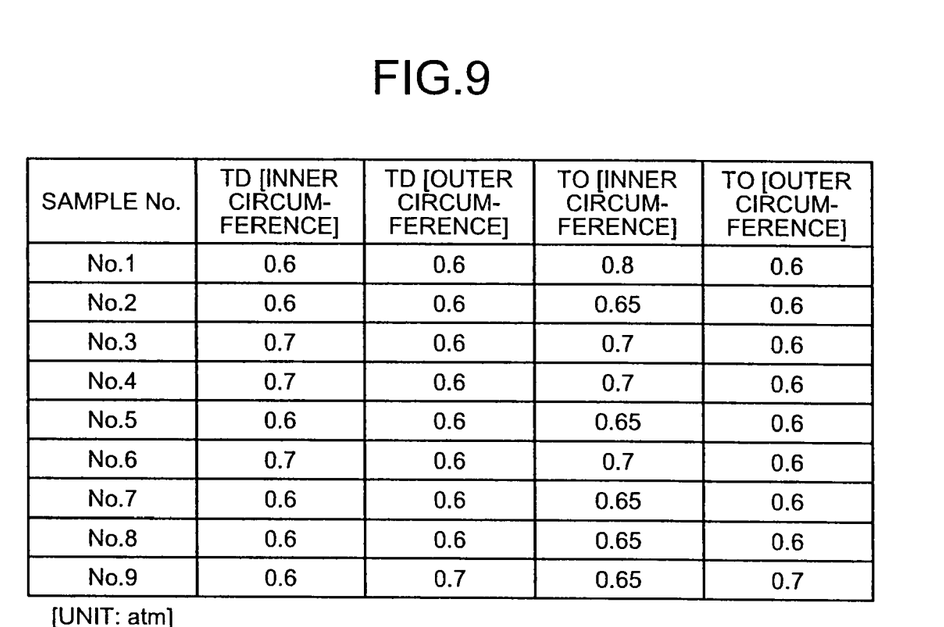
FIG. 9 is a table depicting results of measurement of touch-down (TD) property and takeoff (TO) property of the samples.

The floating characteristics of the magnetic head with respect to the magnetic disks corresponding to the samples No. 1 to No. 9 of the glass substrates 1 were measured and the results are shown in FIG. 9. As the floating characteristics, touchdown (TD) characteristics and takeoff (TO) characteristics are measured using a magnetic head used for an actual magnetic recording and reproducing apparatus.

The TD characteristics are the measurement of the pressure at the point that the magnetic head that has been stably floating relative to a medium rotating at a constant number of rotations under a constant environment touches down the medium by reducing the pressure. The measurement is performed by an acoustic emission sensor (an AE sensor) mounted on the magnetic head. The TO characteristics are the measurement of the pressure at the point that the magnetic head that has been touching a medium rotating at a constant number of rotations under a constant environment floats by increasing the pressure (no outputs from the AE sensor).

As shown in FIG. 9, the TO characteristics on the inner circumferential side and the outer circumferential side of the samples could be reduced excluding the samples No. 3, No. 4, No. 6, and No. 9 down to about 0.6 atmospheric pressure. The TO characteristics of the samples excluding the samples No. 1, No. 3, No. 4, No. 6, and No. 9 were 0.65 atmosphere for the inner circumferential side and 0.6 atmosphere for the outer circumferential side. Particularly, the sample No. 1 showed an unfavorable value of about 0.8 atmosphere for the inner circumferential side. It is presumable that the sample No. 1 has a small inner circumferential surface roughness and the magnetic head is prone to adhere onto the surface, so that once the magnetic head comes into contact with the magnetic disk, the magnetic head tends to adhere to the magnetic disk resulting in unstable floating, which may influence the TO characteristics. The sample No. 3 had nearly the same surface roughness as those of the samples No. 2 and No. 5, however, both the TD and TO characteristics of the inner circumference showed the unfavorable value of 0.7 atmosphere. According to an investigation of the cause, the waviness of the inner circumference of the sample No. 3 exceeded 0.6 nanometer, which was lager than those of the samples No. 2 and No. 5. Thus, it is presumable that this large waviness has influenced the sample No. 3. The sample No. 6 showed that the inner circumferential surface roughness exceeded 0.8 nanometer and the difference between the inner and the outer circumferential surface roughnesses exceeded 0.2 nanometer. Therefore, both the TD and TO characteristics were unfavorable. The sample No. 9 showed the surface roughness level that was no problem, however, both the TD and TO characteristics of the outer circumference showed the unfavorable value of 0.7 atmosphere. The measurement of the wavinesses of the inner and the outer circumferences showed that the waviness difference between the outer circumference and the inner circumference was as large as exceeding 0.2 nanometer. It is therefore presumable that the waviness of the outer circumference that was the largest in all the samples has influenced the sample No. 9. For the samples No. 2, No. 5, No. 7, and No. 8, the TD characteristics on the inner and outer circumferential sides and TO characteristics on the outer circumferential side showed about 0.6 atmosphere, the TO characteristics on the inner circumferential side showed about 0.65 atmosphere, and the difference between the inner circumferential TD characteristics and the inner circumferential TO characteristics showed an extremely favorable value of about 0.05 atmosphere.

Based on the result of these TD and TO characteristics, the glass substrates 1 of the samples No. 2, No. 5, No. 7, and No. 8 are considered to suppress adhesion of the magnetic head and sufficiently prevent occurrence of fly stiction phenomenon. The satisfactory conditions for the surface roughness and the waviness of the glass substrate 1 can be derived referring to FIGS. 7 and 8, which are at least Ra1≦0.8 nanometer, 0 nanometer<Ra1−Ra2≦0.2 nanometer, Wa1≦0.6 nanometer, and 0 nanometer<Wa2−Wa1≦0.2 nanometer.

In the glass substrate 1, only the annular areas E1 and E2 are stated, however, it is preferable that the value of the surface roughness continuously or gradually increases from the outer circumferential side to the inner circumferential side of the main surface, and the average waviness value continuously or gradually decreases from the outer circumferential side to the inner circumferential side of the main surface. Furthermore, it is preferable that the standard deviations σ (Ra) and σ (Wa) of the fluctuation in the average surface roughness and the average waviness in the circumferential direction of the glass substrate 1 be respectively less than 0.05 nanometer.

The glass substrate 1 is preferably used for magnetic disks for equal to or smaller than 1-inch HDDs.

Furthermore, the glass substrate 1 is preferably used for a magnetic disk mounted on an HDD that starts up and stops by a load/unload method.

In the present embodiment, wider range of the nanosized waviness is controlled by at least satisfying Ra1≦0.8 nanometer, 0 nanometer<Ra1−Ra2≦0.2 nanometer, Wa1≦0.6 nanometer, and 0 nanometer<Wa2−Wa1≦0.2 nanometer instead of conventional controlling of the average surface roughness at a 5-micrometer×5-micrometer area of a substrate. This waviness control can suppress adhesion of a head to a disk, which may easily occur in a smaller-sized disk, and sufficiently prevent occurrence of fly stiction.

According to an aspect of the present invention, even when a hard disk is downsized for a downsized HDD mountable for a highly portable device, occurrence of fly stiction can be sufficiently prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A glass substrate for a magnetic disk that is mounted on a hard disk drive, wherein the glass substrate satisfies 0.4 nanometer <Ra1≦0.8 nanometer, 0 nanometer <Ra1−Ra2≦0.2 nanometer, 0.5 nanometer ≦Wa1≦0.6 nanometer, Wa2≦0.65 nanometer, and 0.05 nanometer ≦Wa2−Wa1≦0.15 nanometer where Ra1 is an average surface roughness of a first annular area between 1 millimeter and 3 millimeters outward from an inner periphery of a main surface of the glass substrate, Ra2 is an average surface roughness of a second annular area between 1 millimeter and 3 millimeters inward from an outer periphery of the main surface, Wa1 is an average waviness height of the first area in a circumferential direction of the glass substrate having a cycle of 300 micrometers to 5 millimeters, and Wa2 is an average waviness height of the second area in the circumferential direction having a cycle of 300 micrometers to 5 millimeters, the surface roughness of the glass substrate continuously increases from the outer periphery to the inner periphery of the glass substrate, and the average waviness height of the glass substrate continuously decreases from the outer periphery to the inner periphery of the glass substrate.

2. The glass substrate according to claim 1, wherein the glass substrate is mountable on a hard disk drive of size 1-inch or a hard disk drive that employs a magnetic disk that is smaller than that employed in a hard disk drive of size 1-inch.

3. A magnetic disk apparatus that operates based on a load/unload method and includes a magnetic disk made of a glass substrate, wherein the magnetic disk satisfies 0.4 nanometer <Ra1≦0.8 nanometer, 0 nanometer <Ra1−Ra2≦0.2 nanometer, 0.5 nanometer ≦Wa1≦0.6 nanometer, Wa2≦0.65 nanometer, and 0.05 nanometer ≦Wa2−Wa1≦0.15 nanometer where Ra1 is an average surface roughness of a first annular area between 1 millimeter and 3 millimeters outward from an inner periphery of a main surface of the glass substrate, Ra2 is an average surface roughness of a second annular area between 1 millimeter and 3 millimeters inward from an outer periphery of the main surface, Wa1 is an average waviness height of the first area in a circumferential direction of the glass substrate having a cycle of 300 micrometers to 5 millimeters, and Wa2 is an average waviness height of the second area in the circumferential direction having a cycle of 300 micrometers to 5 millimeters, the surface roughness of the glass substrate continuously increases from the outer periphery to the inner periphery of the glass substrate, and the average waviness height of the glass substrate continuously decreases from the outer periphery to the inner periphery of the glass substrate.

4. The magnetic disk apparatus according to claim 3, wherein the magnetic disk is a hard disk drive of size 1-inch, or a hard disk drive that employs a magnetic disk that is smaller than that employed in a hard disk drive of size 1-inch.

* * * * *